April 6, 1943.  H. M. SMITH  2,315,822
INTERLOCKING SILT ACCUMULATOR ASSEMBLAGE
Filed May 16, 1940   3 Sheets-Sheet 1

Inventor
H.M.Smith
By Arthur H. Sturges
Attorney

April 6, 1943. H. M. SMITH 2,315,822
INTERLOCKING SILT ACCUMULATOR ASSEMBLAGE
Filed May 16, 1940 3 Sheets-Sheet 2

Inventor
H.M.Smith
By Arthur H. Sturges
Attorney

April 6, 1943.  H. M. SMITH  2,315,822
INTERLOCKING SILT ACCUMULATOR ASSEMBLAGE
Filed May 16, 1940  3 Sheets-Sheet 3

Inventor
H. M. Smith
By Arthur H. Sturges
Attorney

Patented Apr. 6, 1943

2,315,822

UNITED STATES PATENT OFFICE 2,315,822

INTERLOCKING SILT ACCUMULATOR ASSEMBLAGE

Harry M. Smith, Valley, Nebr.

Application May 16, 1940, Serial No. 335,529

2 Claims. (Cl. 61—3)

This invention relates to silt accumulators and has for an object to provide means which when placed in silt bearing streams, the banks of which are composed primarily of earth prevent said banks from becoming eroded and the soil thereof washed away whereby valuable agricultural land is conserved.

Another object of the invention is to provide an assemblage of accumulator sections so cooperatively arranged in a silt bearing stream that accretions to land are caused thereby and said stream is confined in a fixed channel whereby treated streams are prevented from meandering promiscuously out of their normal beds and destroying farm land.

A further object of the invention is to provide current deflector sections the parts of each of which are so proportionately arranged that when placed in a stream in a certain manner and as herein later described that each section is prevented from rolling over and out of alignment with other sections when water under pressure is applied thereto during use.

A still further object of the invention is to provide a particular type of section having characteristics cooperative in a particular assemblage of a quantity of said sections, which when arranged in a particular manner with respect to each other and with respect to a bank and bed of a flowing stream cause the said assemblage to cooperate for the above stated purposes more advantageously than heretofore.

Another object of the invention is to provide an assemblage of said sections and cables the latter being so arranged that said cables cooperate with the particular construction of the sections and prevent the latter from becoming moved or rolled over at times when abnormal pressures are applied thereto at the tops of the sections such as is occasioned by rain cloud bursts and freshets which sometimes suddenly and abnormally fill a stream bed with rapidly flowing water and debris.

A further object of the invention is to provide a section the construction of which is such that parts thereof can be anchored firmly into the sloping bank of a stream for securing said section in an operative position.

A primary object of the invention is to provide a silt accumulator, the sections of which are so constructed that when a section is placed in a position of use and abutted against a next adjacent like section that said sections are thereby locked together and an installation is certain of operation whereby subsequent inspection, repairs and expenditure of further labor expense is obviated.

Other and further objects and advantages of the invention will be obvious from the following detailed description thereof, reference being had to the accompanying drawings in which.

As heretofore practiced in the art numerous silt depositing expedients have been employed which when placed in streams in accordance with the prior practice did not provide an interlocking construction whereby gaps would form and some of the debris such as brush, sticks, tumble weeds and the flotsam and jetsam common to silt bearing streams would pass through said gaps and before a sufficient amount of silt had been deposited against and at the down stream side thereof to anchor said expedients securely enough to resist abnormal conditions occasioned by cloud bursts and the like whereby land was often not built up at the down stream side of said expedients. Also the arrangement of the parts of silt accumulators heretofore has been such that at times when the level of a stream would suddenly arise during a sudden abnormal fall of rain that certain of several parts of said prior practice accumulators would be washed down stream and become dislodged from an initial placement and normal working position thereof. Also said prior practice did not provide a device which can be advantageously placed on a sloping bank for catching said debris between the top of the bank of a stream and the adjacent end of an accumulator, whereby at times when a stream bank was composed particularly of sandy soil said bank would wash out and a channel would form around said end of said accumulator permitting water to flow past said end often destroying the entire value of the installation by causing a flow of water where the same was not useful and often actually of damage.

Also as heretofore practiced the parts of silt accumulators when placed in a stream have been joined together by means of numerous wires or the like which necessitates time and labor for said joining, the latter often breaking whereby it has been necessary for repeated inspections, repairs and additions to the accumulators of the prior art and the present invention aims to obviate said undesirable prior practices.

Figure 1:
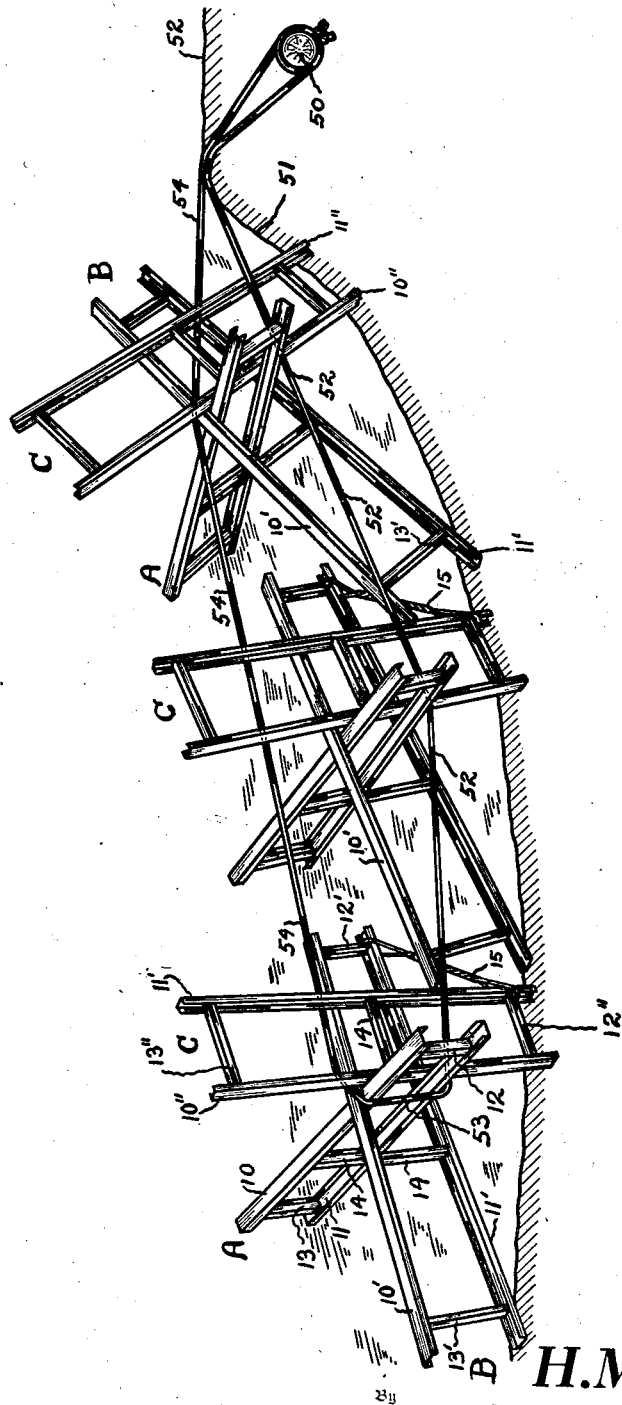
Figure 1 is a perspective view of the silt accumulator of the present invention shown in a position of use with respect to the bed and bank of a stream, said bed and bank being in vertical section, certain later described stay braces employed being omitted from said view and detents which interlock with other parts being depicted therein.

Referring now to the drawings and first to Figure 1, each section of the assemblage includes three primary portions or frames generally indicated at A, B and C, said frames each consisting of not less than two metallic spaced apart side rails 10 and 11 for the section A, like rails 10' and 11' for the frame B and like rails 10" and 11" for the frame C. Between the side rails of the frame A a transversely disposed strut 12 is provided adjacent common ends of said rails and a like but longer strut 13 between the other and opposite ends of said rails. The struts 12 and 13 are disposed away from the extreme ends of the rails whereby certain ends of the latter are adapted to longitudinally and inclinedly embed into the soil at the bottom of a flowing stream as silt deposits or accumulates thereon. Also said ends may be manually inserted into a bank of said stream. Similar struts 12' and 13' are provided for the frame B and like struts 12" and 13" for the frame C.

Intermediate the end struts 12 and 13 each frame A, B and C is preferably provided with a transversely disposed strut 14, said struts being welded, riveted or otherwise suitably secured to their respective rails.

Each frame A, B, and C is preferably of a different length, the frame A being of greatest length and the frame C of substantially lesser length and the frame B of a length approximately intermediate the lengths of the frames A and C.

As shown in Figure 1, the struts 13 are preferably longer than the struts 12 whereby the side rails are preferably disposed convergently toward each other from the struts 13 toward the struts 12, said convergence being such that a frame A may be inserted through and between the side rails of a frame B and moved towards the end strut 12 of a frame B for engaging said frames together; whereupon the side rails of the frames A and B are welded, riveted, bolted or otherwise suitably secured together whereby they abut and in a manner whereby about three-fourths of the length of the frame A is disposed at one side of the frame B and preferably about one-third of the length of the frame B is disposed at one side of the frame A and said frames A and B define a cross in plan, said cross configuration preferably defining a latin cross approximately except that one arm of said cross provided by the frame B is longer than the other arm of said frame B.

The frame rail 10" of the frame C is then disposed in the crotch of the cross formed by the joined frames A and B, the other rail 11" of the frame C being disposed against the rails of the frame B whereby the frame rail 11" of the frame C is disposed adjacent the narrower end of the frame B and in a manner whereby approximately equal portions of the frame C are disposed at each side of said crossed frames A and B, as shown in Figure 1; whereupon the frame C is suitably secured in the said position and relationship to the frames A and B upon an arm of the cross of each section and for each section required. Preferably said frames are fabricated at a centralized factory and joined together as above described near a bank of a stream to be treated.

Each section further preferably includes a detent 15 disposed diagonally from the crotch provided at the junction of the strut 12" and side rail 11" of the frame C and to the like crotch at the junction of the strut 12' and side rail 11' of the frame B. A detent may be formed of angle iron and welded at its ends to adjacent parts of the structure and positioned, as shown in Figure 1, with respect to said frames A, B and C. A detent 15, formed of comparatively heavy cable may be employed as shown, being looped across said crotches, the ends thereof being joined together by any suitable means such as U-bolt cable connectors, not shown; whereupon the oppositely disposed sides of said loop are twisted together for making the detent taut, a detent being omitted from that section of the accumulator which is closest to a later described anchor or at the anchor end of an accumulator, as shown in Figure 1. When constructed of cable the detents when twisted and tightened provide loops engaged in said crotches which are prevented from becoming passed over the ends of the rails 11 since said crotches are spaced away from said ends.

Figure 3:
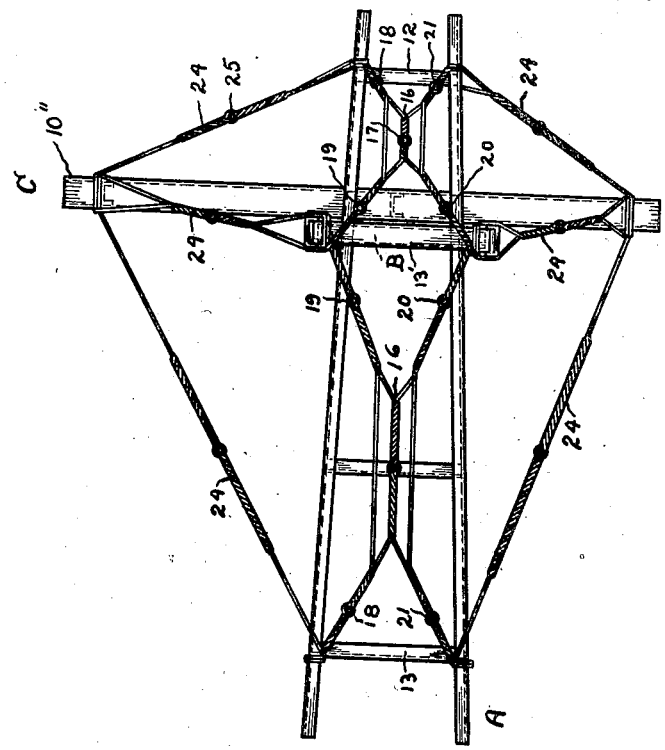
Figure 3 is a side elevation of the section shown in Figure 2.
Figure 2:
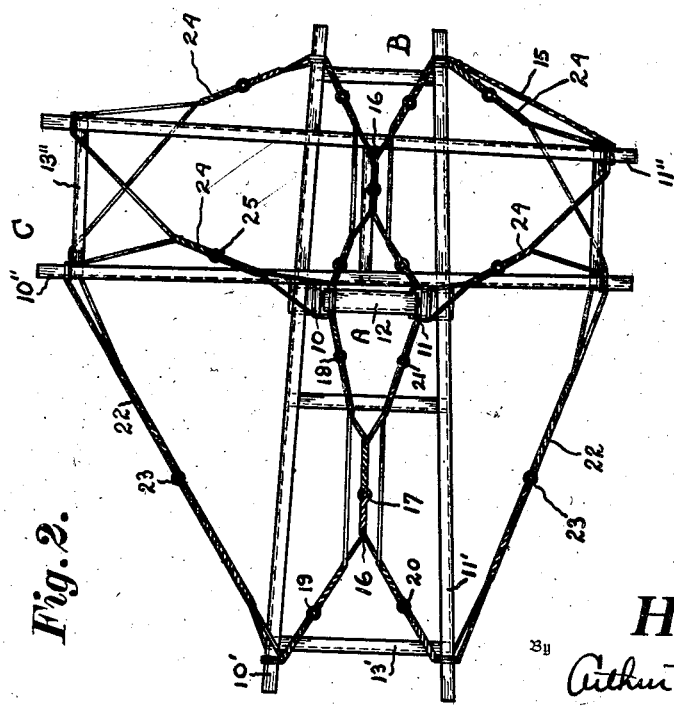
Figure 2 is a front elevation of a section of said accumulator.
Figures 4, 5:
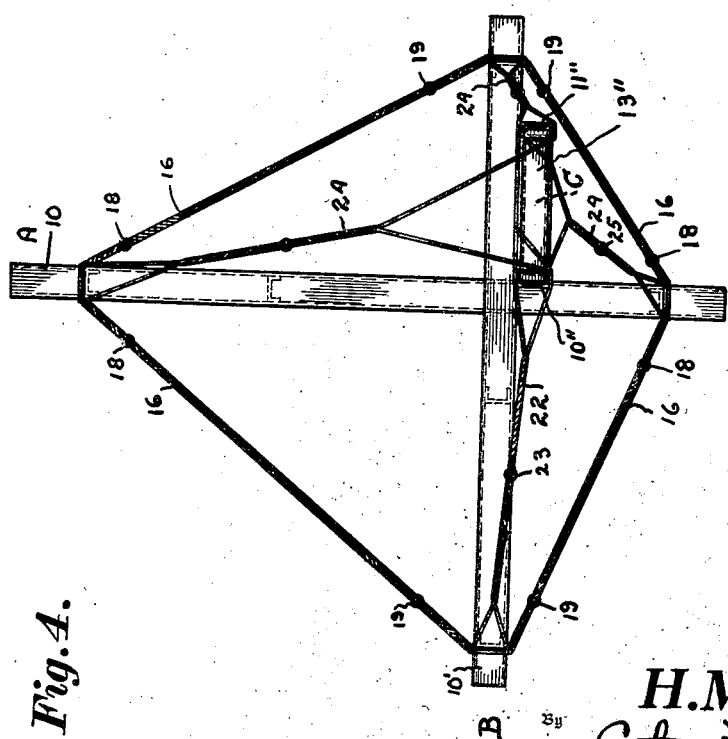
Figure 4 is a top plan view of said section.
Figure 5 is a diagrammatic illustration of an assemblage of a large number of said sections disposed in a flowing stream which provide said accumulator in conjunction with cables and an anchor employed.

At this time the frames A, B and C having been arranged as heretofore described and provided, if desired, with a detent-stay 15 are then preferably provided with trusses, as shown in Figures 2, 3 and 4 at times when said frames are of great size for heavy duty in deep streams.

Four trusses 16 are employed for each section being disposed in a common plane. As shown in Figures 2 and 3, the trusses 16 are disposed in alignment with and between the side rails of the frames A and B and at a right angle to the frame C. Since the trusses 16 are each alike in construction but one thereof is described herein.

The trusses 16 are formed in a particular manner and of cable or comparatively heavy wire. To form a truss one end of a cable is secured to the outer end of the rail 10 of the frame A and extended to the outer end of the rail 10' of the frame B, being then looped over said end and extended diagonally to and around the rail 11 of the frame A, along the outside of the rail 10 of the frame A and to the outer end of the rail 11' of the frame B; whereupon the cable is looped around the outer end of the frame B and extended diagonally to the outer end of the rail 10 of the frame A where the ends of the cable are joined together by any suitable means such as U-bolt keepers, not shown, whereby said truss at that time includes two outer portions thereof which are substantially parallel with respect to each other and two inner portions which cross each other diagonally. At this time said cable being looped and disposed, as above described, provides two triangular configurations in plan, the apexes thereof being abutted together where the cable portions cross, the bases of said triangles being substantially parallel and in substantial parallelism with the frame rails of the frame B.

Referring to Figure 2, said truss is further fabricated by inserting a crow bar or other suitable implement between the crossed cable portions adjacent the apex of the said triangle configurations and said crossed cable portions twisted upon each other providing a medially disposed eye 17, as shown in Figure 2; whereupon cable portions adjacent the end of the frame rail 10 of the angle iron frame A are similarly twisted providing an eye 18, and eyes 19, 20 and 21 similarly provided, as shown in Figure 2, said twisting of said cable not being excessive whereupon the workmen further twist the several cable portions gradually by twisting one eye and the succeeding eyes by inserting the said tool in any or all of the said eyes as selected until the cable is formed into the configuration shown in Figure 2 and all portions thereof are taut. The truss forming operation is then repeated until the other three trusses are provided.

Each section is now preferably provided with eight stays for heavy duty, two thereof being alike in construction and arrangement and the other six stays being like each other. The manner of constructing the plain stays 22 is by looping a suitable length of cable around the outer ends of each of the frame rails 10' and 11' of the frame B and around the outer ends respectively of the frame rail 10'' of the frame C whereby each of the two plain stays 22 at this time consists of a loop of cable, the ends thereof being secured together by means of U-bolt keepers, not shown, whereupon said elongated tool or crow bar is inserted between the oppositely disposed parallel sides of said loops of cables and the latter twisted, providing the eyes 23, said twisting being continued until the plain stays 22 are taut.

The other six stays are each alike in construction and therefore but one is herein described said stays being provided with bifurcated ends. Each of the six bifurcated stays 24 includes a suitable length of wire which is secured to the outer end of the frame rail 10'' of the frame C and adjacent the longer strut 13'' thereof and extended to and looped around the end of the frame rail 10 of the frame A adjacent the strut 12 thereof and from the latter extended to and secured to the outer end of the frame rail 11'' of the frame C, as shown in Figure 2; whereupon a suitable tool is inserted between the cable portions and the latter twisted forming an eye 25, as shown in Figure 2, the operation being continued until all six of the bifurcated stays 24 are provided on each section, said stays being twisted until taut.

As thus described it will be noted that each section includes a rigid frame work which cannot be deformed by the application of exterior force without deformation of one or more of its members; that since each section is formed of a combination of triangles and since a triangle is the only polygon whose shape cannot alter without changing the length of its sides and since the sides of the triangles of each section are rigidly constructed, trussed and stayed, each section is thereby so designed that the only strains applicable to the component parts thereof are tension and compression whereby wherever compression can be applied to the channel iron parts thereof in addition to the resistance provided by said iron, the component parts of the trusses aid in a resistance of said compression and that when tension is applied to said truss said iron portions cooperate to resist said tension whereby a rigid, economical construction is provided, the parts of which cooperate in an assemblage of said sections as later herein described.

It will be also noted that as thus described the bifurcated ends of the stays 24 are applied to opposite sides and at each end of the frame C and at each side of said frame C and that the outer ends of each of the trusses 16 cooperatively brace each outer end of the frames A and B in conjunction with the bifurcated stays 24. The plain stays 22 being disposed in approximately a plane with the frame rails 10' and 11' of the frame B.

In order to install the several sections a suitable "dead-man" 50 is suitably embedded in said bank or other suitable anchorage employed for a later described cable.

The section not having a detent 15 is first placed closely adjacent to the top of the bank 51 and in the position shown in Figure 1, whereby the free ends of the rails 10'' and 11'' and at the narrower end of the frame C are driven into the soil of the sloping bank together with the end of the rail 11' of the frame B at the wider end thereof and adjacent the strut 13' of the frame B whereby at least a portion of the first section is disposed above the level of the top 52 of the bank.

It will be understood that for long sloping banks the operation is repeated and as thus described it will be noted that the particular construction and proportions of the parts of the sections are such that they may be secured in an operative position and attached to the soil of banks which are sharply inclined, the longer frame A of each section extending down stream.

Other sections are added as shown in Figure 1, the portion of each frame A which includes the wider ends of said frames extending down stream, said frames A being disposed substantially parallel with the direction of flow of said stream and the frame rails 11' of each frame B at their wider ends being embedded in the soil at the bottom of the stream, the narrower ends of the frames C which carry detents being placed on the bed of said stream.

Each section is also cooperatively assembled with the next adjacent section in a manner whereby the upper side rail 10' of each frame B abuts against the detent 15 of a next adjacent section at the upstream side of said detents, whereby the assemblage is adapted to resist water pressure evenly throughout its entire length and the frames B are maintained in alignment across the bed of a stream.

After the sections are placed together and in the relationship as above described a cable is then preferably looped through the sections in a particular manner.

The lower portion 52 of the cable extends from the anchor 50 being disposed below each frame A of each section and in front of or at the upstream side of each frame C and outwardly away from said anchor 50 to the last section, the cable being provided with a portion 53 which extends across the crotch provided at the junction of the frames A and B of the last section and upwardly, having a portion 54 disposed from said crotch and extending back to the anchor and at the down stream side and against the upper portions of each frame C of each section whereby as thus described water pressure applied to the upper portions of each section C is resisted by the portion 54 of the cable. Also water pressures applied to the upper portions of each frame C is also resisted by the portion 52 of said cable, said portion 52 of the cable preventing the lower portions of each frame C from tilting or swinging upwardly away from the bed of a stream, said portion 54 of said cable preventing the upper portions of each frame C of each section from swinging downwardly and in the direction of the down stream side of the assemblage.

As thus described each section of the accumulator when provided with stays and trusses outlines a truncated, irregular octohedron, the faces of the latter being outlined by the trusses 16, stays 22 and stays 24, said truncations being six in number and occurring at the ends of the frames A, B and C whereby sixteen planes are outlined, eight thereof being at the ends of said frames and the other eight being outlined by said stays and trusses.

A large number of sections are disposed outwardly from the bank 51 and approximately transversely of the flowing stream as shown in Figure 5 and in operation and assuming that the several sections have been built and arranged with respect to each other and with respect to the bank and bed of a stream as above described, debris carried by the waters of said stream impinge against the assemblage and becomes lodged, said debris accumulating until the mass thereof is appreciable, extending from the bank of the stream to the end of the assemblage providing an obstruction to said flow; whereupon the water at the down stream side of the accumulator is comparatively still, a back eddy being formed in the current of the water on said down stream side whereby silt in said water settles to the bottom of the stream and becomes deposited, said deposit accumulating in extent until land is provided thereby, said land being sufficient to deflect said flow and prevent erosion of said bed.

Also at times when said bed is full of said deposited silt and said deposit is sufficient in height to deflect said flow during a normal level of said flow the accumulator of the present invention protects the top of said bank of said stream during an abnormal level of flow since sections of the assemblage are oriented upon and portions of said sections anchored into said bank, said oriented sections having parts which extend above said abnormal level for trapping said debris.

The longer portions of the frame A being disposed downstream with respect to the frames B disposed across said stream resist a dislodging of the sections at times when debris accumulates on and against the frames B.

From the foregoing description it is thought to be obvious that an interlocking silt accumulator assemblage constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as herein claimed.

I claim:

1. A silt accumulator comprising a plurality of like sections, each said section having three elongated frames, said frames each having two oppositely disposed spaced apart side rails, a strut being disposed between and secured to said rails adjacent to each end of the rails, two of said frames being so secured together that a configuration of cruci-form in plan is provided, the rails of the third frame each being disposed lengthwise across and secured to one of the arms of said cross and having approximately equal portions of its length disposed at each side of the frames which define said cross, a detent having an end secured to an end of a rail of said third frame, said detent being disposed diagonally with respect to said third frame and having its other end secured to the end of a rail of one of said frames which provide said cruci-form; said sections being disposed side by side upon the bed of a stream with the frames which carry said third frames disposed in approximately longitudinal alignment across said bed and supported inclinedly therefrom by those ends of said third frames which carry said detents, and a cable having ends anchored to the bank of said stream, said cable being engaged with each said section for joining said sections together, a portion of the lower ends of aligned frames being disposed against the detents of a next adjacent section at the up stream side of said detents for facilitating a maintenance of said approximate alignment during use.

2. In a silt accumulator, a plurality of like sections, each section comprising three elongated frames, each frame having two oppositely disposed spaced apart rails, a strut being disposed between and secured to said rails adjacent to each end of the rails, two of said frames being disposed at a right angle and secured together to form a cross in which the planes of the two frames are disposed at a right angle to each other, the third frame being disposed lengthwise across one of the frames forming said cross and secured thereto with its plane disposed in parallel relation to the plane of said other frame and with one of its rails abutting against the rails of the second frame forming said cross, the ends of said third frame extending beyond each side of the frames which define said cross, stays secured to the struts and rails of said frames and extending from one frame to another for bracing said section, and a detent for each section, each said detent having an end secured to one of the rails of said third frame, the other end of said detent being secured to an end of that certain frame across which both rails of said third frame are disposed, said sections being disposed side by side upon the bed of a flowing stream with a portion of the opposite end of said certain frame of each section disposed against and at the upstream side of the detent of a next adjacent section for maintaining alignment of said sections during use.

HARRY M. SMITH.